United States Patent [19]
Shirk et al.

[11] Patent Number: 6,089,601
[45] Date of Patent: Jul. 18, 2000

[54] INFLATOR FOR VEHICLE OCCUPANT PROTECTION SYSTEM

[75] Inventors: Bryan W. Shirk, Mesa; Ahmad K. Al-Amin, Higley; Timothy A. Swann, Mesa; Roy D. Van Wynsberghe, Mesa; Charles A. King, Mesa; Russell Bell, Mesa; Michael F. Fink, Mesa, all of Ariz.

[73] Assignees: TRW Inc.; TRW Vehicle Safety Systems Inc., both of Lyndhurst, Ohio

[21] Appl. No.: 09/052,847

[22] Filed: Mar. 31, 1998

[51] Int. Cl.⁷ ..................................................... B60R 21/28
[52] U.S. Cl. ........................... 280/742; 280/741; 280/736; 280/737
[58] Field of Search ..................................... 280/736, 737, 280/741, 742

[56] References Cited

U.S. PATENT DOCUMENTS

| | | |
|---|---|---|
| 3,197,234 | 7/1965 | Bertrand . |
| 3,559,678 | 2/1971 | Donner . |
| 3,774,807 | 11/1973 | Keathley et al. .................... 280/737 X |
| 3,786,843 | 1/1974 | Stephenson et al. ............... 280/737 X |
| 3,822,724 | 7/1974 | Clapp et al. . |
| 3,862,767 | 1/1975 | Chute . |
| 4,006,919 | 2/1977 | Neuman . |
| 4,021,058 | 5/1977 | Suzuki et al. . |
| 4,050,483 | 9/1977 | Bishop ................................ 280/737 X |
| 5,054,811 | 10/1991 | Unterforsthuber et al. ............ 280/742 |
| 5,193,584 | 3/1993 | Watts . |
| 5,251,659 | 10/1993 | Sturman et al. . |
| 5,304,971 | 4/1994 | Sturman et al. . |
| 5,327,936 | 7/1994 | Takayanagi . |
| 5,344,186 | 9/1994 | Bergerson et al. ...................... 280/741 |
| 5,433,476 | 7/1995 | Materna et al. ......................... 280/736 |
| 5,537,998 | 7/1996 | Bauman . |
| 5,580,085 | 12/1996 | Cuevas et al. ...................... 280/736 X |
| 5,590,906 | 1/1997 | Faigle et al. ......................... 280/736 X |
| 5,613,702 | 3/1997 | Goetz ....................................... 280/735 |
| 5,820,162 | 10/1998 | Fink ......................................... 280/742 |
| 5,913,537 | 6/1999 | Goetz ....................................... 280/741 |
| 5,927,753 | 7/1999 | Faigle et al. ............................ 280/736 |
| 5,947,514 | 9/1999 | Keller et al. ............................ 280/742 |

FOREIGN PATENT DOCUMENTS

97/34785  9/1997  WIPO .

OTHER PUBLICATIONS

U.S. Patent Application Serial No. 08/906,042, filed Aug. 5, 1997, entitled "Vehicle Occupant Protection Apparatus."
U.S. Patent Application Serial No. 08/990,590, filed Dec. 15, 1997, entitled Vehicle Occupant Protection Apparatus. Now US 5927753.

*Primary Examiner*—Brian L. Johnson
*Assistant Examiner*—Bryan Fischmann
*Attorney, Agent, or Firm*—Tarolli, Sundheim, Covell, Tummino & Szabo L.L.P.

[57] ABSTRACT

An apparatus (10) includes an inflator structure (12) and a modular valve assembly (18). The inflator structure (12) defines an inflation fluid pressure chamber (15), a fluid exit opening (60), and a fluid flow path (62) extending between the chamber (15) and the exit opening (60). The modular valve assembly (18) has a plurality of parts that are interconnected separately from the inflator structure (12), including a metering member (182) and a tubular valve housing (180) containing and supporting the metering member (182) for movement within the valve housing (180). The modular valve assembly (18) has an installed position in which the valve housing (180) extends longitudinally across the flow path (62) defined by the inflator structure (12). The inflator structure (12) further defines a valve compartment (76) in which the valve housing (180) is receivable and movable longitudinally across the flow path (62) upon movement of the modular valve assembly (18) to its installed position.

10 Claims, 4 Drawing Sheets

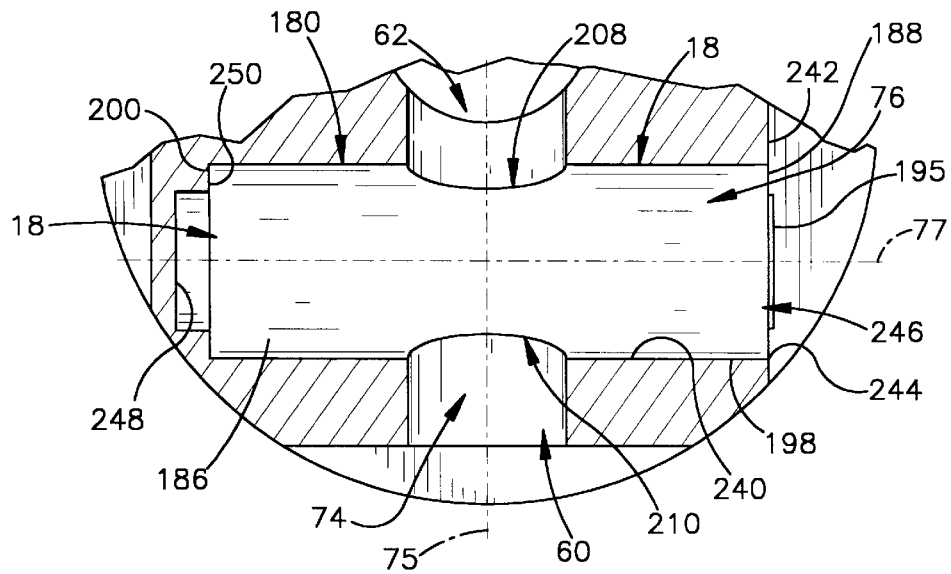
Fig.7
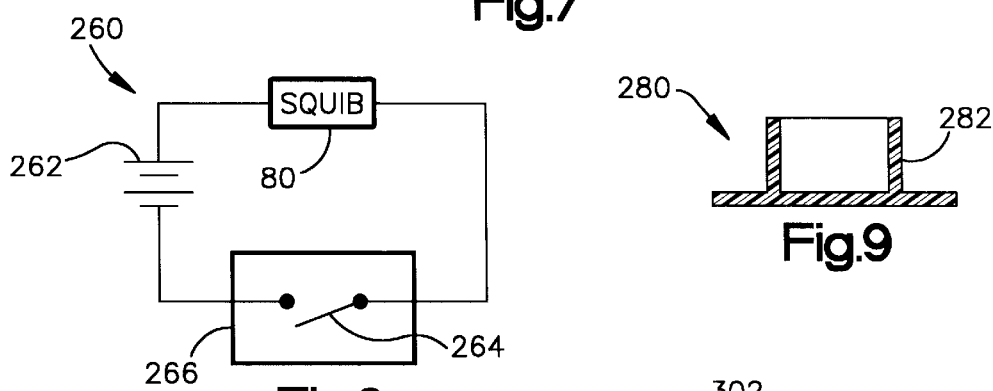
Fig.8
Fig.9
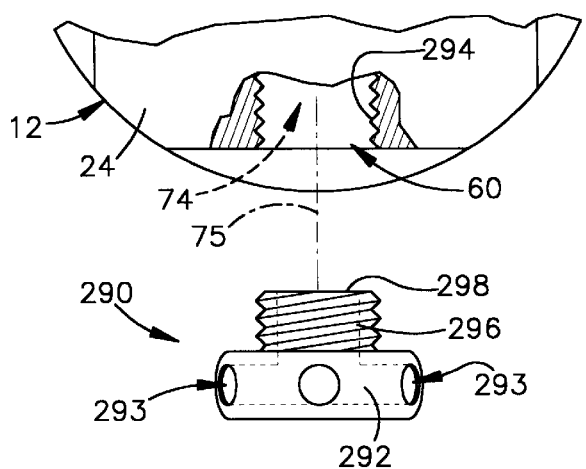
Fig.10
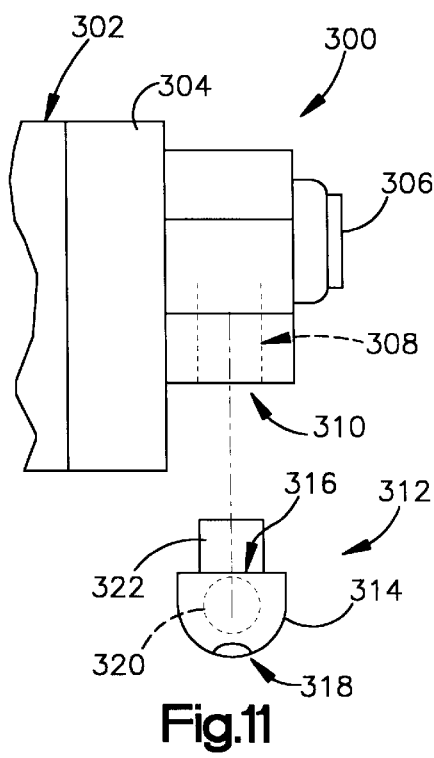
Fig.11

INFLATOR FOR VEHICLE OCCUPANT PROTECTION SYSTEM

FIELD OF THE INVENTION

The present invention relates to an apparatus for inflating an inflatable vehicle occupant protection device to help protect an occupant of a vehicle.

BACKGROUND OF THE INVENTION

An inflatable vehicle occupant protection device, such as an air bag, is inflated upon the occurrence of a vehicle crash. The air bag is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated and emits inflation fluid which inflates the air bag into the vehicle occupant compartment. The air bag can then engage a vehicle occupant to help protect the occupant from a forceful impact with parts of the vehicle as a result of the crash.

The manner in which the inflating air bag engages the vehicle occupant can be influenced by the pressure of the inflation fluid in the air bag. Therefore, it may be desirable to regulate the flow rates at which the inflation fluid flows from the inflator to the air bag.

SUMMARY OF THE INVENTION

In accordance with the present invention, an apparatus comprises an inflator structure and a modular valve assembly. The inflator structure defines an inflation fluid pressure chamber, a fluid exit opening, and a fluid flow path extending between the chamber and the exit opening. The modular valve assembly comprises a plurality of parts that are interconnected separately from the inflator structure. Those parts include a metering member and a tubular valve housing containing and supporting the metering member for movement within the valve housing.

The modular valve assembly has an installed position in which the valve housing extends longitudinally across the flow path defined by the inflator structure. The inflator structure further defines a valve compartment in which the valve housing is receivable and movable longitudinally across the flow path upon movement of the modular valve assembly to its installed position.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein:

FIG. 7 is a view similar to FIG. 3 showing parts in a fully assembled relationship; and FIG. 8 is schematic view of an electrical circuit including a part of the apparatus of FIG. 1.

FIG. 9 is a partial view of an optional part of the inflator.

FIG. 10 is a partial view of a second embodiment of the invention.

FIG. 11 is a partial view of a third embodiment of the invention.

DESCRIPTION OF A PREFERRED EMBODIMENT

Figure 1:
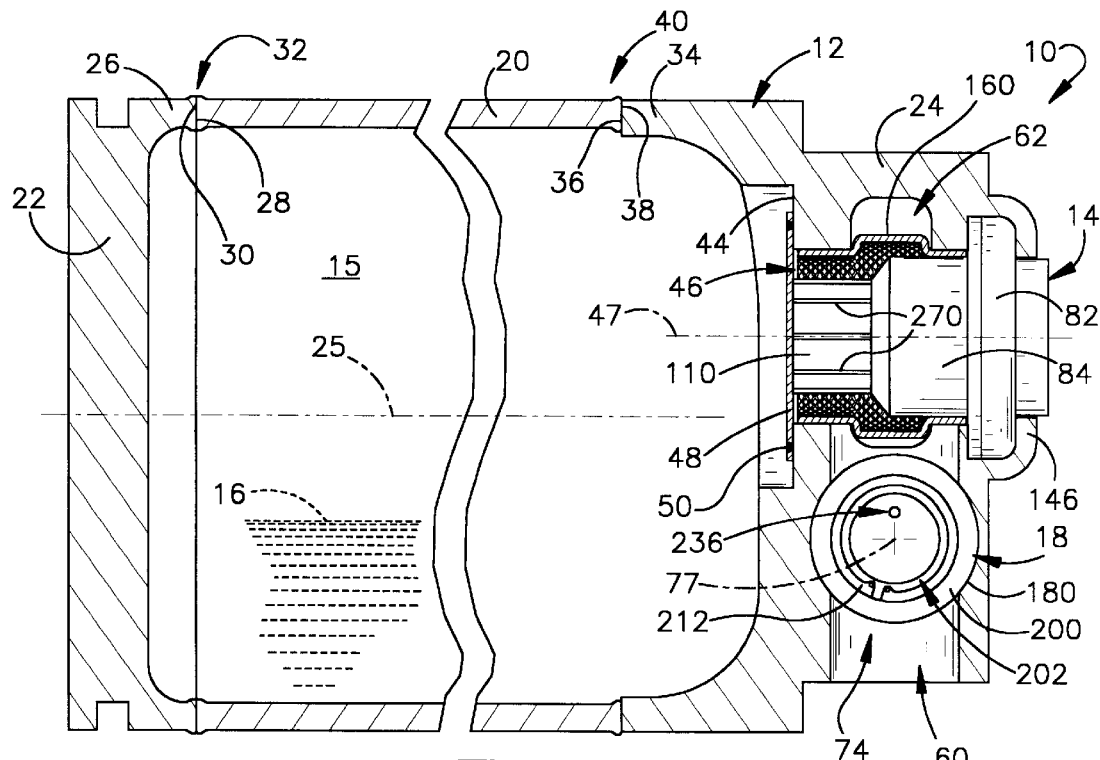
FIG. 1 is a side view, partly in section, of an apparatus comprising a preferred embodiment of the present invention.

An inflator 10 comprising a preferred embodiment of the present invention is shown in FIG. 1. The inflator 10 comprises a source of inflation fluid for an inflatable vehicle occupant protection device such as an air bag. The inflator 10 thus includes a container 12 and an initiator assembly 14. The container 12 defines a pressure chamber 15 storing pressurized inflation fluid 16. When the initiator assembly 14 is actuated, it opens the container 12 to initiate an outlet flow of inflation fluid. In accordance with the present invention, the inflator 10 further includes a valve assembly 18 which regulates the outlet flow of inflation fluid.

The inflation fluid 16 stored in the chamber 15 preferably consists essentially of helium at a storage pressure within the range of about 4,000 psi to about 7,000 psi. However, the inflation fluid 16 may have any other composition and storage pressure suitable for inflating an air bag or other vehicle occupant protection device.

The container 12 has a tubular body wall 20 and a pair of generally circular opposite end walls 22 and 24, each of which is centered on a longitudinal axis 25. The first end wall 22 has an axially projecting rim portion 26. An annular end surface 28 of the rim portion 26 abuts an annular end surface 30 of the body wall 20. A first friction weld 32 fixes and seals the first end wall 22 and the body wall 20 together at their abutting end surfaces 28 and 30. The second end wall 24 similarly has an axially projecting rim portion 34 with an annular end surface 36 abutting an annular end surface 38 of the body wall 20. A second friction weld 40 fixes and seals the second the end wall 24 and the body wall 20 together at their abutting end surfaces 36 and 38.

The second end wall 24 of the container 12 has an annular inner shoulder surface 44 facing inward of the chamber 15. The inner shoulder surface 44 defines a circular chamber opening 46 which is centered on an axis 47 spaced radially from the central axis 25. A rupturable closure disk 48 extends across the chamber opening 46 to block the inflation fluid 16 from flowing outward. The closure disk 48 overlies the inner shoulder surface 44 around the opening 46, and is fixed and sealed to the end wall 24 by a circumferentially extending weld 50.

In the preferred embodiment of the present invention, the second end wall 24 of the container 12 defines a single inflation fluid exit opening 60. The exit opening 60 is the only opening through which the inflation fluid 16 can exit the inflator 10. The second end wall 24 also defines a fluid flow path 62 extending from the chamber opening 46 to the exit opening 60. The valve assembly 18 is operatively disposed in the flow path 62 near the exit opening 60. The initiator assembly 14 projects into the flow path 62 between the chamber opening 46 and the valve assembly 18.

Figure 2:
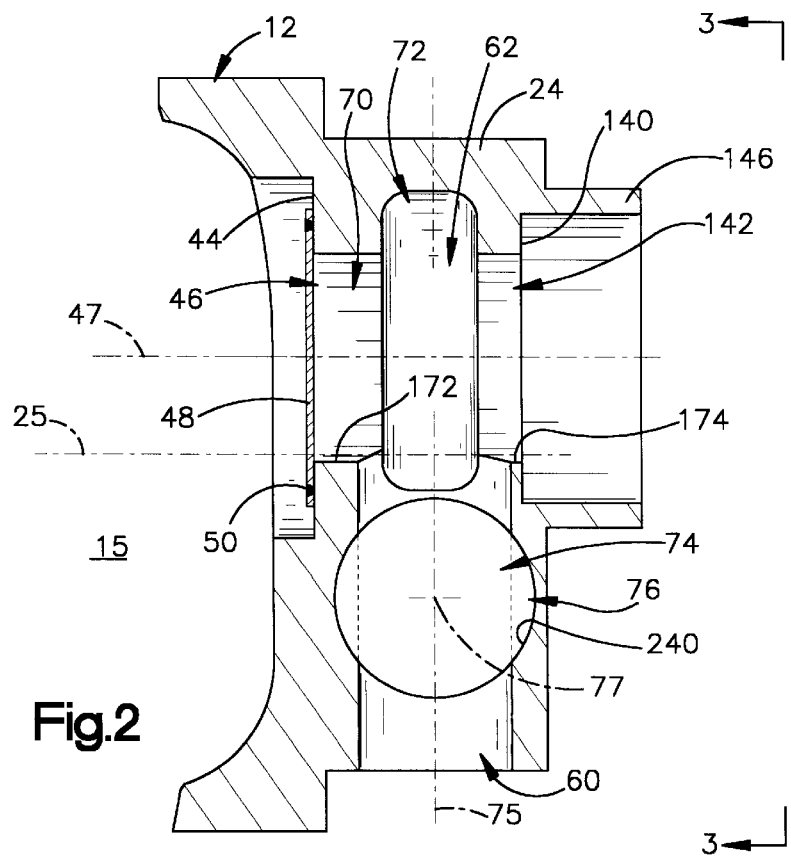
FIG. 2 is an enlarged view showing parts of the apparatus of FIG. 1 in a partially assembled condition.

As shown in greater detail in FIG. 2, the flow path 62 has a plurality of generally distinct portions located between the chamber opening 46 and the exit opening 60. These include a relatively short cylindrical portion 70 extending axially outward from the chamber opening 46. An annular portion 72 of the flow path 62 extends radially and axially outward from the short cylindrical portion 70. A longer cylindrical portion 74 of the flow path 62 extends radially from the annular portion 72 to the exit opening 60, and is centered on an axis 75 perpendicular to the axis 47.

Figure 3:
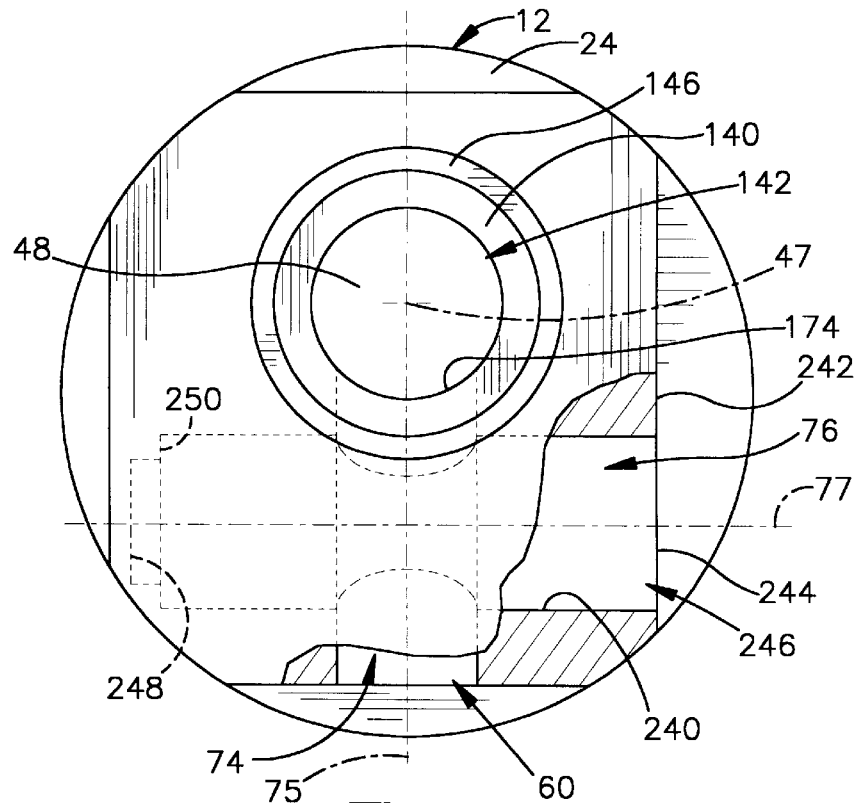
FIG. 3 is a view taken on line 3—3 of FIG. 2.

Also shown in FIG. 2 is a cylindrical valve compartment 76. The valve compartment 76 intersects the radially extending portion 74 of the flow path 62, and is centered on an axis 77 perpendicular to the axis 75. As described more fully below with reference to FIG. 3, the valve compartment 76 is sized to receive the valve assembly 18 (FIG. 1).

Figure 4:
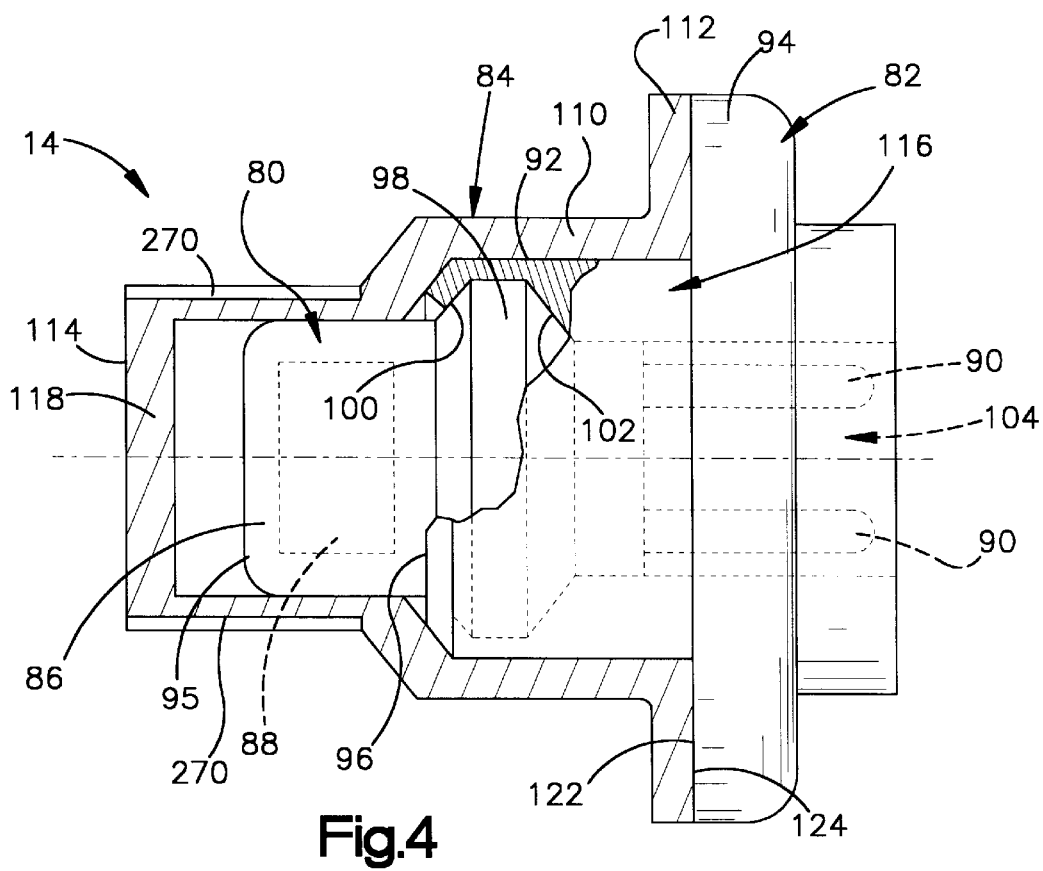
FIG. 4 is an enlarged view, partly in section, of parts of the apparatus of FIG. 1.

The initiator assembly 14 includes an initiator 80 (FIG. 4), a retainer 82, and a support cup 84. The initiator 80 in the preferred embodiment of the present invention is an electrically actuatable device which is known as a squib, and has a generally cylindrical casing 86 containing a small charge of pyrotechnic material 88. The pyrotechnic material 88 is ignited in a known manner upon the passage of electric current through the squib 80 between a pair of electrodes 90 projecting from the casing 86. When the pyrotechnic material 88 is ignited, it rapidly produces combustion products that are spewed outward from the casing 86.

The retainer 82 has a hollow cylindrical body 92 and a ring-shaped peripheral flange 94 that projects radially outward of the body 92. The flange 94 is located at one end of the body 92, and a rim 96 is located at the opposite end of the body 92. The casing 86 is received within the body 92 of the retainer 82, and has an end portion 95 projecting outward from the body 92. The rim 96 on the body 92 of the retainer 82 is crimped against the casing 86. The rim 96 clamps a radially enlarged, tapered portion 98 of the casing 86 firmly between a pair of opposed tapered inner surfaces 100 and 102 of the body 92. The electrodes 90 are accessible in a socket 104 which is open at the opposite end of the body 92.

The support cup 84 also has a hollow cylindrical body 110 and a ring-shaped peripheral flange 112. The body 110 of the support cup 84 has a closed end 114 and an open end 116. A circular end wall 118 of the support cup 84 defines the closed end 114 of the body 110. The flange 112 projects radially outward from the open end 116 of the body 110.

The cylindrical body 92 of the retainer 82 and the projecting portion 95 of the casing 86 are received within the support cup 84. The body 110 of the support cup 84 has a radially stepped configuration so as to mate with the body 92 of the retainer 82, the crimped rim 94 of the retainer 82, and the projecting portion 95 of the casing 86. An inner side surface 122 of the retainer flange 94 abuts an outer side surface 124 of the cup flange 112.

As further shown in FIG. 2, the second end wall 24 of the container 12 has an annular outer shoulder surface 140 facing oppositely away from the annular inner shoulder surface 44. The outer shoulder surface 140 defines a circular opening 142 which is centered on the axis 47. As shown in FIG. 1, the initiator assembly 14 is received through the opening 142, with the flange 112 on the retainer 82 abutting the end wall 24 at the outer shoulder surface 140. The initiator assembly 14 thus projects into the fluid flow path 62 defined by the end wall 24, as noted above. An annular rim portion 146 of the end wall 24 initially projects axially away from the outer shoulder surface 140 and is subsequently crimped around the retainer flange 94 to hold the initiator assembly 14 securely in place on the end wall 24.

The support cup 84 of the initiator assembly 14 projects inward along the axis 47 into abutment with the closure disk 48 at the chamber opening 46. The initiator assembly 14 is thus mounted on the end wall 24 in a load-bearing relationship with the closure disk 48. More specifically, the closure disk 48 is subjected to the storage pressure of the inflation fluid 16 in the chamber 15. In accordance with the present invention, the closure disk 48 has a specified strength that is not great enough for the closure disk 48 to withstand the stress induced by the storage pressure without support from the initiator assembly 14. Therefore, the closure disk 48 transmits a fluid storage pressure force axially outward against the initiator assembly 14 at the abutting end wall 118 of the support cup 84. The initiator assembly 14, in turn, transmits the storage pressure force to the end wall 24 of the container 12 where the retainer flange 94 adjoins the crimped rim 146 of the end wall 24.

Figure 5:
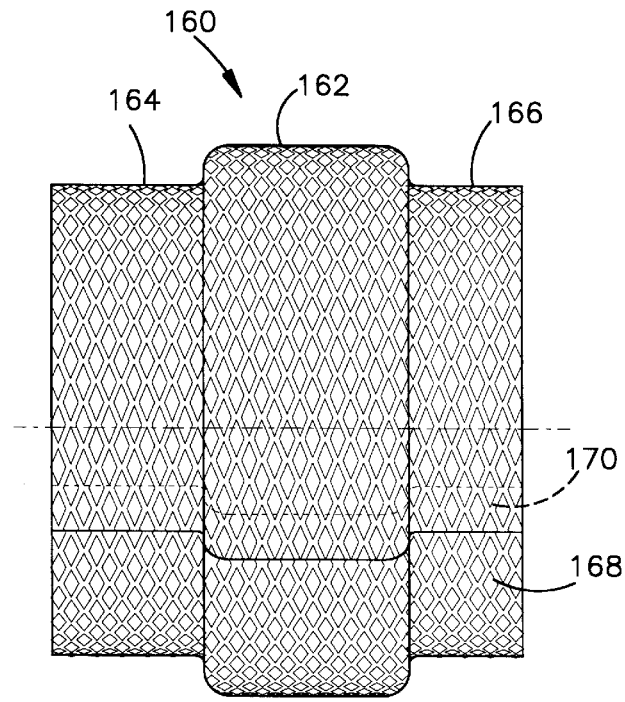
FIG. 5 is an enlarged view of another part of the apparatus of FIG. 1.

A generally cylindrical filter 160 extends circumferentially around the initiator assembly 14 within the fluid flow path 62, as shown in FIG. 1. As shown separately in FIG. 5, the filter 160 has a central section 162 and a pair of opposite end sections 164 and 166. The end sections 164 and 166 of the filter 160 fit closely against a corresponding pair of annular inner surfaces 172 and 174 (FIG. 2) of the end wall 24. The surface 172 defines the short cylindrical portion 70 of the flow path 62. The surface 174 is separated from the surface 172 by the annular portion 72 of the flow path 62. The central section 162 of the filter 160 is radially enlarged so as to project radially into the annular portion 72 of the fluid flow path 62. In the preferred embodiment of the present invention, the filter 160 is a one-piece structure formed of flattened, expanded metal, and is configured as a rolled strip with overlapping opposite end portions 168 and 170.

The valve assembly 18 is a modular assembly of parts that are interconnected separately from the container 12 and the initiator assembly 14. As shown separately in FIG. 6, the interconnected parts of the valve assembly 18 include a tubular valve housing 180, a spool 182, and a spring 184 (shown schematically).

The valve housing 180 has a cylindrical side wall 186 and a circular end wall 188, each of which is centered on a longitudinal axis 189. A cylindrical inner surface 192 of the end wall 188 defines a vent 194 extending axially through the center of the end wall 188. A piece of adhesive tape 195 on the outer side of the end wall 188 covers the vent 194 to block dirt and dust from entering the valve housing 180 through the vent 194. The side wall 186 has cylindrical inner and outer surfaces 196 and 198. The cylindrical inner surface 196 defines a longitudinally extending bore 199. An annular end surface 200 of the side wall 186 defines an open end 202 of the housing 180 opposite the end wall 188.

The side wall 186 of the valve housing 180 further has a pair of annular inner edge surfaces 204 and 206. The first inner edge surface 204 defines a circular inlet port 208 extending through the side wall 186. The second inner edge surface 206 defines a circular outlet port 210 extending through the side wall 186 at a location diametrically opposite the inlet port 208.

Figure 6:
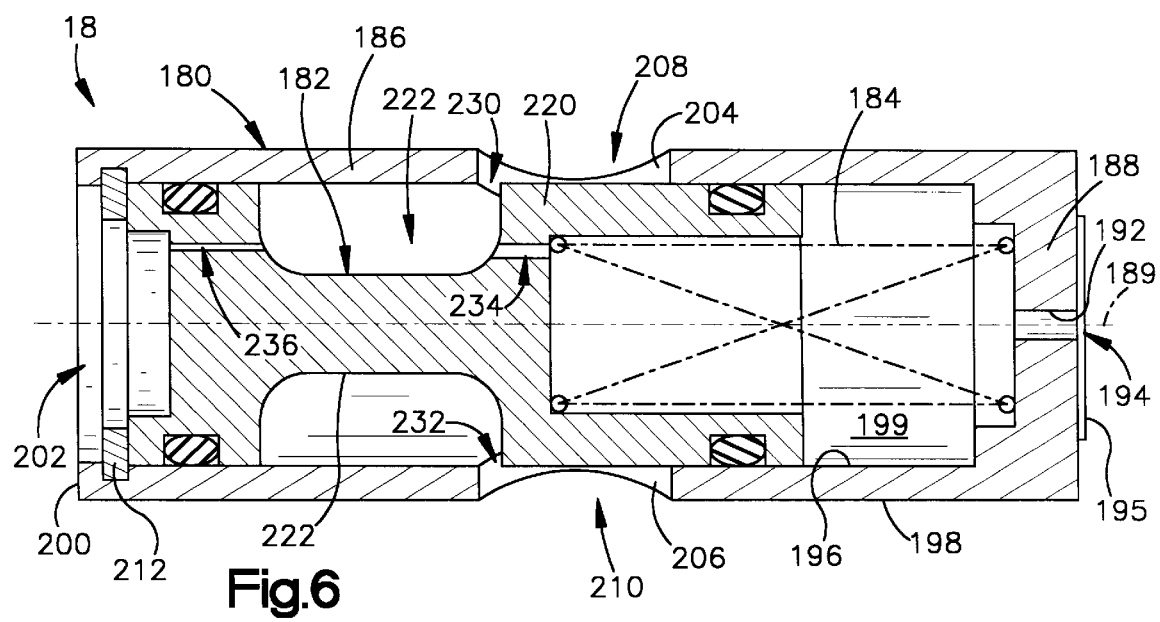
FIG. 6 is an enlarged sectional view of other parts of the apparatus of FIG. 1.

The spool 182 in the preferred embodiment of the present invention is a spool which is contained and supported for movement axially within the bore 199. The spool 182 has an initial position in which it abuts a split ring 212 adjacent the open end 202 of the housing 180, as shown in FIG. 6, and is movable axially toward the end wall 188 against a bias of the spring 184.

A cylindrical land 220 on the spool 182 is located next to a circumferentially extending groove 222 in the spool 182. The spool 182 and the housing 180 together define inlet and outlet orifices 230 and 232 which are disposed between the groove 222 and the ports 208 and 210 and which vary in flow area upon movement of the spool 182 axially within the bore 199. A first pilot orifice 234 in the spool 182 communicates the groove 222 with the vent 194. A second, oppositely extending pilot orifice 236 communicates the groove 222 with the open end 202 of the housing 180.

Referring again to FIG. 2, the valve compartment 76 in the end wall 24 of the container 12 is defined in part by a cylindrical inner surface 240 of the end wall 24. A planar side surface 242 (FIG. 7) of the end wall 24 has an annular edge 244 defining a circular open end 246 of the valve compartment 76. A planar inner surface 248 of the end wall 24 has a circular shape centered on the axis 77, and defines a closed inner end of the valve compartment 76.

When the valve assembly 18 is being installed on the end wall 24, it is received longitudinally through the open end 246 of the valve compartment 76. The valve assembly 18 is then moved inward along the length of the valve compartment 76 until the annular end surface 200 of the housing 180 abuts an opposed annular inner shoulder surface 250, shown in FIG. 7, of the end wall 24, shown in FIG. 1. The valve assembly 18 is thus moved longitudinally across the radially extending portion 74 of the flow path 62 to an installed position in which the ports 208 and 210 in the housing 180 are centered on the axis 75. The valve assembly 18 is preferably received entirely within the compartment 76 so that the housing 180 does not project longitudinally outward from the open end 246 of the compartment 76. The valve assembly 18 is retained in its installed position by an interference fit where the cylindrical outer surface 198 of the housing 180 adjoins the cylindrical inner surface 240 of the end wall 24.

As shown schematically in FIG. 8, the squib 80 in the initiator assembly 14 is included in an electrical circuit 260 with a power source 262, which preferably comprises the vehicle battery and/or a capacitor, and a normally open switch 264. The switch 264 is part of a sensor 266 which senses one or more vehicle conditions that indicate the occurrence of a crash. Such a sensor is known in the art.

The sensor 266 may sense a crash-indicating condition that meets or exceeds a predetermined threshold level. This indicates the occurrence of crash having a level of severity which is predetermined to require inflation of the air bag or other vehicle occupant protection device associated with the inflator 10. The switch 264 then closes and electric current is directed through the squib 80 to ignite the pyrotechnic material 88 (FIG. 4) in the casing 86. The ignited pyrotechnic material 88 produces combustion products which rupture and emerge from the casing 86 within the support cup 84. The combustion products further rupture and emerge from the support cup 84 within the flow path 62 (FIG. 1). Preferably, the body 110 of the support cup 84 has a plurality of axially extending score lines 270 which are spaced apart circumferentially about its periphery. Each score line 270 defines a coextensive stress riser which is rupturable under the influence of the combustion products emitted from the squib 80. This facilitates rupturing of the support cup 84 radially outward at the periphery of the cylindrical body 110. The fluid storage pressure acting outward against the end wall 118 of the support cup 84 also facilitates peripheral rupturing of the cylindrical body 110 by blocking movement of the end wall 118 inward of the chamber 15 under the influence of the combustion products in the support cup 84.

When the support cup 84 ruptures in the foregoing manner, it can no longer provide the support that the closure disk 48 needs to withstand the stresses induced by the storage pressure acting outward from the chamber 15. This causes the closure disk 48 to rupture under those stresses, and thereby to release the inflation fluid 16 to flow outward through the chamber opening 46 and further outward along the flow path 62 to the valve assembly 18 and the exit opening 60. The filter 160 blocks the severed pieces of the support cup 84 and the closure disk 48 from being carried outward to the valve assembly 18 or the exit opening 60.

The pressure in the chamber 15 decreases continuously from the storage level to the ambient level as the inflation fluid 16 flows outward. However, the valve assembly 18 regulates the outlet flow of inflation fluid to prevent the flow rate from decreasing in direct proportion to the decreasing pressure in the chamber 15. As the inflation fluid flows through the groove 222 (FIG. 6) between the inlet and outlet orifices 230 and 232, some of the inflation fluid flows through the pilot orifices 234 and 236. The inflation fluid flowing through the first pilot orifice 234 flows further outward through the vent 194 (after rupturing the tape 195). The inflation fluid flowing through the second pilot orifice 236 is not vented, but instead pressurizes the space between the spool 182 and the surface 248 defining the closed end (FIG. 7) of the valve compartment 76. This causes the spool 182 to move to the right, as viewed in FIG. 6, and thereby to enlarge the inlet and outlet orifices 230 and 232. Such enlargement of the inlet and outlet orifices 230 and 232 helps to maintain desired flow rates outward along the flow path 62 as the pressure in the chamber 15 decreases from the storage level toward the ambient level.

The flow rates provided by operation of the valve assembly 18 are predetermined with reference to the volume and storage pressure of the inflation fluid 16 in the chamber 15. The initial and subsequent sizes of the inlet and outlet orifices 230 and 232, as determined by the initial and subsequent positions of the spool 182, are specified accordingly. Since the valve assembly 18 is a modular assembly of parts that are interconnected separately from the other parts of the inflator 10, it can be tested separately from the other parts of the inflator 10 to ensure that it will function as specified when it has been installed in the inflator 10.

An optional part 280 of the inflator 10 is shown in FIG. 9. This part 280 is a plastic closure cap which is used to block dust, dirt, and the like from entering the flow path 62 through the exit opening 60 in the end wall 24 of the container 12. A cylindrical body portion 282 of the cap 280 is receivable through the exit opening 60 an interference fit with the end wall 24. The outlet flow of inflation fluid ejects the cap 280 from the exit opening 60 when the initiator assembly 14 is actuated.

A second embodiment of the present invention is shown partially in FIG. 10. In the second embodiment, a different optional part 290 is used with the inflator 10. This optional part 290 is a thrust-neutral diffuser having a cylindrical body 292 with a circumferentially extending array of inflation fluid exit openings 293. An internal screw thread 294 is provided on the end wall 24 of the container 12. The internal screw thread 294 engages an external screw thread 296 on a stem portion 298 of the diffuser 290 upon insertion of the stem 298 through the exit opening 60. The diffuser 290 is thus installed temporarily to render the inflator 10 thrust-neutral for shipping and handling, and is removed prior to installation of the inflator 10 in a vehicle.

An inflator 300 comprising a third embodiment of the present invention is shown partially in FIG. 11. Like the inflator 10 described above, the inflator 300 includes a container 302 with an end wall 304 supporting an initiator assembly 306. The end wall 304 defines a fluid flow path 308 with a solitary exit opening 310 in substantially the same manner as described above with reference to the end wall 24. However, the end wall 304 does not have a valve compartment like the valve compartment 76. This is because the inflator 300 has an alternative valve assembly 312 which is mounted on the outside, rather than within, the end wall 304.

The valve assembly 312 has a partially cylindrical housing 314 with inlet and outlet ports 316 and 318. A spool 320 is supported for movement longitudinally within the housing 314 in the same manner as described above with reference to the spool 182 in the housing 180. A cylindrical mounting stem 322 projects from the inlet port 316. The mounting stem 322 is receivable through the exit opening 310 in an interference fit with the end wall 304 of the container 302.

From the above description of the invention, those skilled in the art will perceive improvements, changes and modifications. Such improvements, changes and modifications within the skill of the art are intended to be covered by the appended claims.

What is claimed is:

1. Apparatus comprising:

an inflator defining an inflation fluid pressure chamber and having an end wall, said end wall being a monolithic structure and including a fluid exit opening through which inflation fluid flows to exit from the inflator and a fluid flow path extending between said chamber and said exit opening; and an initiator assembly attached to said end wall; and a modular valve assembly comprising a plurality of parts that are interconnected separately from said inflator, said parts including a spool and a tubular valve housing containing and supporting said spool for movement within said valve housing, said modular valve assembly having an installed position in which said valve housing extends longitudinally across said flow path, said end wall further defining a valve compartment in which said valve housing is receivable and movable longitudinally across said flow path upon movement of said modular valve assembly to said installed position, said inflator having a cylindrical shape with a longitudinal central axis, said valve housing having an axis which is transverse to said longitudinal central axis and extending longitudinally across a portion of said flow path that extends radially of said longitudinal central axis.

2. Apparatus as defined in claim 1 wherein said valve housing is received in said valve compartment in an interference fit with said end wall.

3. Apparatus as defined in claim 1 wherein said interconnected parts of said modular valve assembly further include a spring which acts upon said spool in said valve housing.

4. Apparatus as defined in claim 1 wherein said initiator, when activated, initiates a flow of inflation fluid from said chamber to said exit opening along said flow path, said initiator having a central axis spaced radially from said longitudinal central axis and located on a side of said longitudinal central axis opposite a side of said longitudinal central axis where said valve housing is located.

5. Apparatus as defined in claim 1 further comprising a rupturable closure disk which, when ruptured, causes said inflation fluid to flow outward from said chamber, said rupturable closure disk having a center spaced radially from said longitudinal central axis and being aligned with said central axis of said initiator.

6. Apparatus as defined in claim 1 wherein said chamber stores inflation fluid at a storage pressure level with the fluid pressure in said chamber decreasing continuously from said storage pressure to an ambient pressure level as said inflation fluid flows outward.

7. Apparatus as defined in claim 1 wherein said exit opening is the only opening through which inflation fluid can exit said inflator.

8. Apparatus as defined in claim 7 further comprising a protective closure cap closing said exit opening.

9. Apparatus as defined in claim 7 further comprising a temporary, thrust-neutral diffuser received in said exit opening.

10. Apparatus comprising:

an inflator structure defining an inflation fluid pressure chamber, a fluid exit opening, and a fluid flow path extending between said chamber and said exit opening; and a modular valve assembly comprising a plurality of parts that are interconnected separately from said inflator structure, said parts including a spool and a tubular valve housing containing and supporting said spool for movement within said valve housing, said modular valve assembly having an installed position in which said valve housing extends longitudinally across said flow path;

said inflator structure further defining a valve compartment in which said valve housing is receivable and movable longitudinally across said flow path upon movement of said modular valve assembly to said installed position; and a temporary, thrust-neutral diffuser received over said exit opening.

* * * * *